United States Patent

Wada et al.

[11] Patent Number: 5,198,950
[45] Date of Patent: Mar. 30, 1993

[54] THIN-FILM PERPENDICULAR MAGNETIC RECORDING AND REPRODUCING HEAD

[75] Inventors: Toshiaki Wada, Takatsuki; Hideki Mine, Osaka, both of Japan

[73] Assignee: Sumitomo Special Metals Co., Ltd., Osaka, Japan

[21] Appl. No.: 655,167

[22] Filed: Feb. 14, 1991

[30] Foreign Application Priority Data

Feb. 28, 1990 [JP] Japan .................................. 2-50292

[51] Int. Cl.$^5$ .............................................. G11B 5/147
[52] U.S. Cl. .................................................. 360/126
[58] Field of Search ................................... 360/125–126

[56] References Cited

U.S. PATENT DOCUMENTS

| 4,745,506 | 5/1988 | Nakamura | 360/126 X |
| 4,943,882 | 7/1990 | Wada | 360/126 |

Primary Examiner—A. J. Heinz
Attorney, Agent, or Firm—Watson, Cole, Grindle & Watson

[57] ABSTRACT

A thin-film magnetic head includes a magnetic member having a principal surface formed with a first groove extending in parallel to a sliding surface adapted to face a magnetic recording medium, a non-magnetic material filling the groove, and at least a thin-film conductor coil, an interlaminar insulating film, a main magnetic-pole film and a protective film formed one upon another. The magnetic member being connected to the main magnetic-pole film though a via hole portion. The head has an exposed laminated surface defining the sliding surface. The magnetic member has also a second groove formed in its principal surface, crossing the first groove at right angles thereto, and filled with a non-magnetic material. The conductor coil and films are formed on the magnetic member immediately above the intersection of the first and second grooves. The non-magnetic material in the second groove is exposed in the sliding surface. The second groove has a width which is smaller than that of the first groove and is slightly larger than that of the main magnetic-pole film adjacent to its end exposed in the sliding surface, and a depth which is at least equal to that of the first groove. The magnetic member is exposed in the sliding surface in the vicinity of the main magnetic-pole film adjacent to its exposed end.

12 Claims, 4 Drawing Sheets

○: THIN-FILM MAGNETIC HEAD ACCORDING THIS INVENTION
△: THIN-FILM MAGNETIC HEAD OF PRIOR ART ental view showing that surface of the transducer portion of a known thin-film head which is adapted to face a magnetic recording medium, and a perpendicular sectional and side elevational view of the head, respectively. The head comprises a magnetic member 10 composed of e.g. soft ferrite, a non-magnetic material 3 forming a gap layer, a thin-film conductor coil 4, an insulating film layer 5, a thick magnetic film 7 formed from e.g. a Permalloy, Sendust, or amorphous cobalt alloy and serving to prevent the magnetic saturation of a main magnetic-pole film during recording, the main magnetic-pole film 8, and a protective film 9, which lie one upon another as shown in FIG. 5(b).

THIN-FILM PERPENDICULAR MAGNETIC RECORDING AND REPRODUCING HEAD

BACKGROUND OF THE INVENTION

1. Field of the Invention

This invention relates to an improvement in a thin-film perpendicular magnetic recording and reproducing head for a computer, tape, picture recording, etc. More particularly, it is a thin-film perpendicular magnetic recording and reproducing head which comprises a magnetic member for a return path adapted to face a magnetic recording medium, and having orthogonal grooves filled with a non-magnetic material, and a plurality of layers formed one upon another immediately above the intersection of the grooves, and which exhibits improved output characteristics attained by the exposure of the magnetic member on its side facing a main magnetic-pole film and along the track width.

2. Description of the Prior Art

A thin-film perpendicular magnetic recording and reproducing head (hereinafter referred to simply as "thin-film magnetic head") generally has a very small magnetic circuit and employs a thin magnetic film having a high permeability and a high saturation magnetic flux density, and is, therefore, suitable for achieving a high recording density. It has a high degree of dimensional accuracy and yet is inexpensive, as it is manufactured by a process based on semiconductor technology. This type of head is, therefore, expected to become a main type of perpendicular magnetic head.

The thin-film magnetic heads include an inductive head which is used for recording or reproducing, and a head of the magnetic resistance effect type for reproducing.

Reference is made to FIGS. 5(a) and 5(b) of the accompanying drawings, which are a schematic front elevational view showing that surface of the transducer portion of a known thin-film head which is adapted to face a magnetic recording medium, and a perpendicular sectional and side elevational view of the head, respectively. The head comprises a magnetic member 10 composed of e.g. soft ferrite, a non-magnetic material 3 forming a gap layer, a thin-film conductor coil 4, an insulating film layer 5, a thick magnetic film 7 formed from e.g. a Permalloy, Sendust, or amorphous cobalt alloy and serving to prevent the magnetic saturation of a main magnetic-pole film during recording, the main magnetic-pole film 8, and a protective film 9, which lie one upon another as shown in FIG. 5(b).

In this type of head, a plurality of layers have ends exposed in a surface facing the magnetic recording medium 30, and the magnetic member 10 for a return path to the recording medium 30 has a groove 2 which is filled with the non-magnetic material 3. The non-magnetic material 3 and the magnetic member 10, however, have therebetween a boundary plane 12 which is parallel to the main magnetic-pole film 8, as shown in FIG. 5(a). This arrangement allows the magnetic flux produced by the main magnetic pole to return only to the surface facing it, and disables the head to produce a satisfactorily high reproducing output.

SUMMARY OF THE INVENTION

Under these circumstances, it is an object of this invention to provide a thin-film perpendicular magnetic recording and reproducing head which enables the effective return of the magnetic flux produced by the main magnetic pole and thereby exhibits improved reproducing output characteristics.

We, the inventors of this invention, have done a great deal of research work to realize a magnetic member for a return path along which the magnetic flux can be returned effectively, and thereby a thin-film magnetic head having an improved reproducing output, and have found that a head including a magnetic member having orthogonal grooves, and at least a thin-film conductor coil, an interlaminar insulating film, a main magnetic-pole film and a protective film formed one upon another immediately above the intersection of the grooves enables the magnetic flux to return not only to the area facing the main magnetic-pole film, but also along the track width, and exhibits an improved reproducing output.

The object of this invention is, therefore, attained by a thin-film perpendicular magnetic recording and reproducing head including a magnetic member for a return path having a principal surface formed with a first groove extending in parallel to a sliding surface adapted to face a magnetic recording medium, a non-magnetic material filling the groove, and at least a thin-film conductor coil, an interlaminar insulating film, a main magnetic-pole film and a protective film formed one upon another, the magnetic member being connected to the main magnetic-pole film though a via hole portion, the head having an exposed laminated surface defining the sliding surface, characterized in that the magnetic member has also a second groove formed in its principal surface, crossing the first groove orthogonally, and filled with a non-magnetic material, the conductor coil and the films being formed immediately above the intersection of the first and second narrow groove, the second groove being exposed in the sliding surface, and having a width which is smaller than that of the first groove, and is larger by 1 to 100 microns than that of the main magnetic-pole film adjacent to its end exposed in the sliding surface, and a depth of 3 to 100 microns which is equal to, or larger than, that of the first groove, the magnetic member being exposed in the laminated surface in the vicinity of the main magnetic-pole film adjacent to its exposed end.

DETAILED DESCRIPTION OF THE INVENTION

Figure 1A:
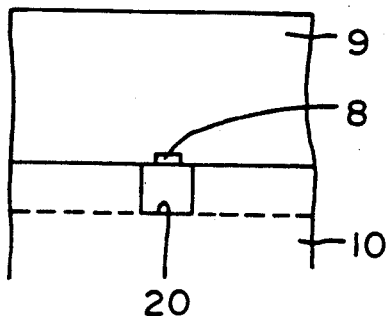
FIGS. 1(a), 1(b) and 1(c) are schematic front elevational, perpendicular sectional, and top plain views, respectively, of a thin-film magnetic head embodying this invention.
Figure 1B:
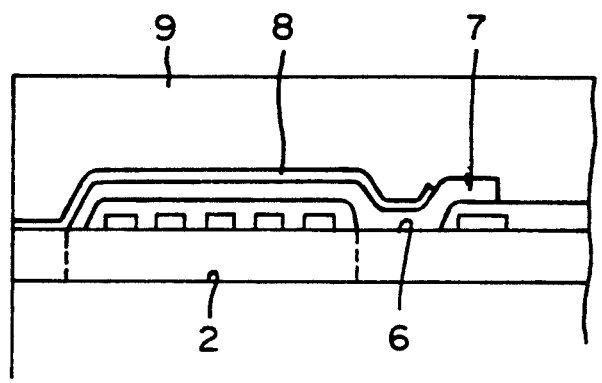
Figure 1C:
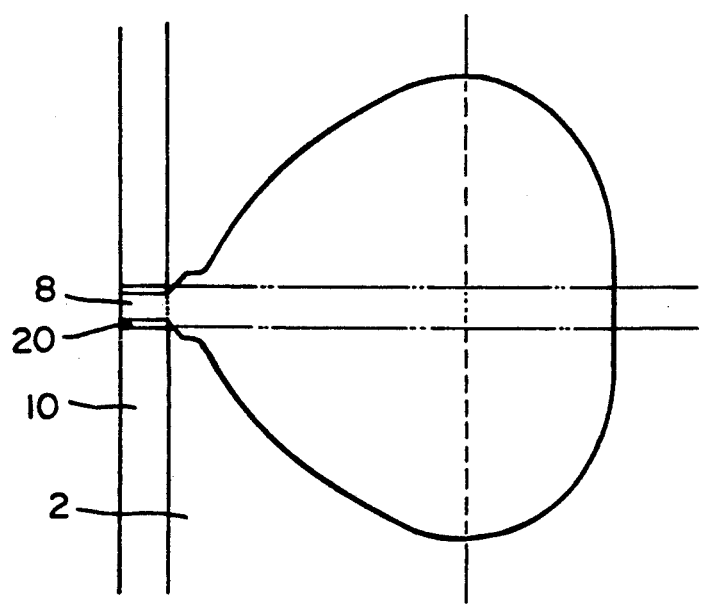

The thin-film head of this invention is characterized by including a magnetic member for a return path which is so shaped adjacent to a sliding surface adapted to face a magnetic recording medium, as to extend not only in the area facing a main magnetic-pole film, but also along the track width, though it has a portion interrupted by a non-magnetic material, as shown in FIGS. 1(a) to 1(c).

Figure 2:
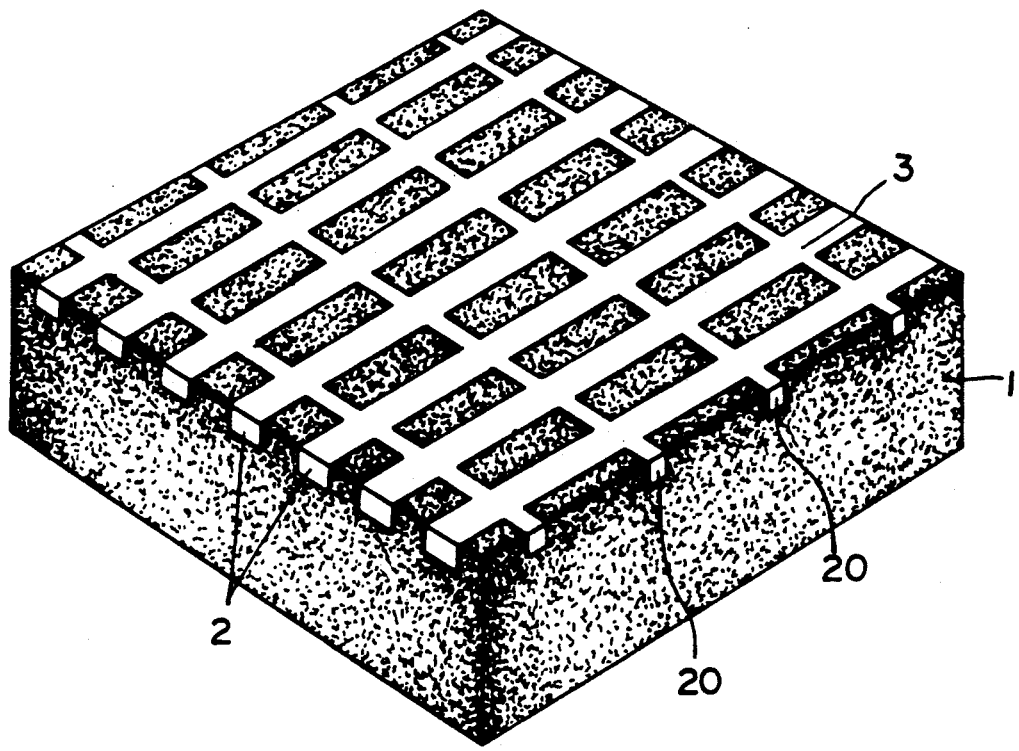
FIG. 2 is a perspective view of a magnetic substrate embodying this invention.

The thin-film head of this invention can be manufactured easily and efficiently by using a grooved magnetic substrate 1 composed of a magnetic material, such as Ni-Zn or Mn-Zn ferrite, and having a principal surface formed with a plurality of spaced apart main grooves 2 each having a flat or stepped bottom, and a plurality of spaced apart narrow grooves 20 crossing the main grooves 2 at right angles thereto, the grooves 2 and 20 being filled with a non-magnetic material 3, such as glass, $SiO_2$, $Al_2O_3$ or barium titanate, as shown in FIG. 2.

Each main or first groove 2 serves to prevent the leakage of magnetic flux between a main magnetic pole and a magnetic member for a return path. Each narrow or second groove 20 defines a gap layer having a width which is slightly (1 to 100 microns) larger than the track width. The substrate 1 is used to make by a process including a series of steps a plurality of perpendicular thin-film heads each having a narrow groove 20 which is specifically sized and shaped relative to a main magnetic-pole film 8 in the sliding surface along which a magnetic recording medium is slidable, as shown in FIG. 1(a).

The magnetic head of this invention enables the magnetic flux produced by the main magnetic-pole film to return not only to the area facing it, but also along the track width, and exhibits improved recording and reproducing properties.

A process for manufacturing the thin-film magnetic head of this invention will now be described by way of example with reference to FIGS. 2 and 3(a) to 3(f).

(1) A plurality of spaced apart main grooves 2 and a plurality of spaced apart narrow grooves 20 crossing the main grooves 2 are formed in one principal surface of a magnetic substrate 1 formed from Ni-Zn or Mn-Zn ferrite, as shown in FIG. 2. A non-magnetic material 3, such as glass, $SiO_2$, $Al_2O_3$ or barium titanate, is caused by melting or sputtering to fill the grooves 2 and 20. Then, the surface of the substrate 1 carrying the non-magnetic material 3 in the grooves 2 and 20 is subjected to mechanochemical polishing, whereby the substrate 1 as shown in FIG. 2 is obtained.

Figure 3A:
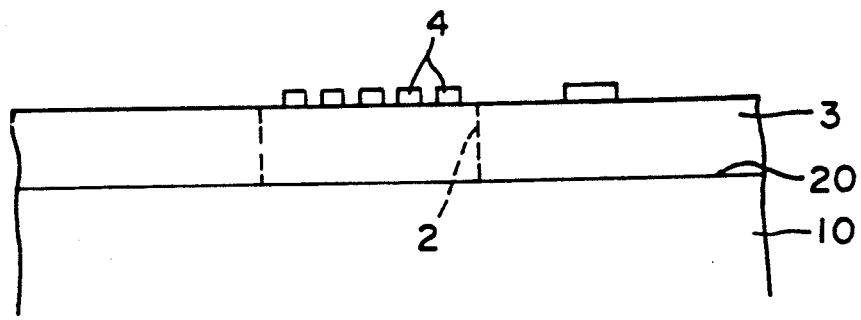
FIGS. 3(a) to 3(f) are a set of views illustrating a process for manufacturing the thin-film magnetic head of this invention.
Figure 3B:
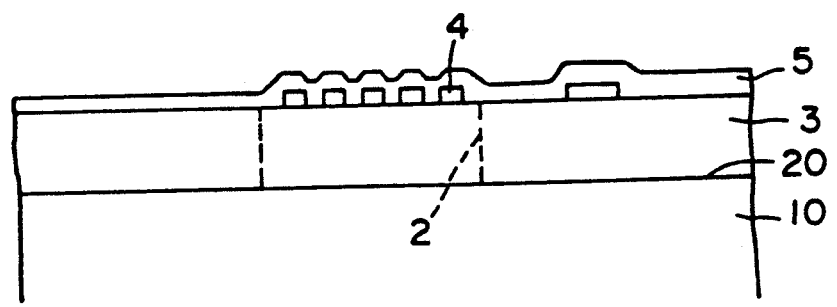

(2) The magnetic substrate 1 is cut to form a plurality of magnetic members 10. A thin-film conductor coil 4 is formed by sputtering or vacuum deposition from e.g. Au, Cu, Cr or Al on the polished surface of each magnetic member 10, as shown in FIG. 3(a). If the magnetic member 10 is of Mn-Zn ferrite, an insulating film layer is formed thereon before the conductor coil 4 is formed.

Figure 3C:
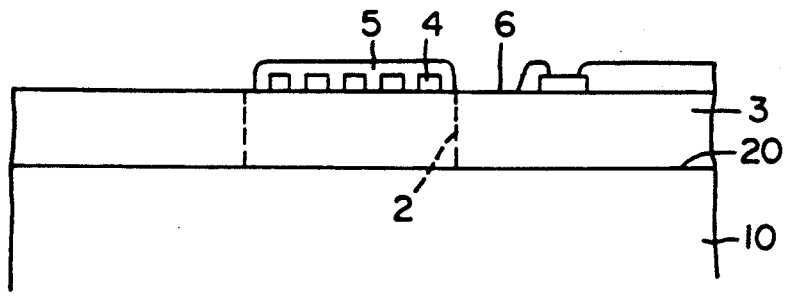
Figure 3D:
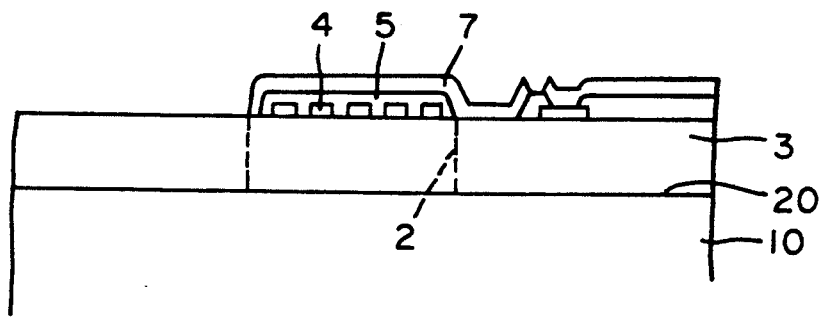

(3) An interlaminar insulating film 5 is formed to make electrical insulation between the conductor coil 4 and a thick magnetic film 7 defining a main magnetic pole as will hereinafter be described, as shown in FIG. 3(d). The insulating film 5 may be of an inorganic oxide such as $SiO_2$ or $Al_2O_3$, or of an organic material such as polyimide.

(4) As the insulating film 5 has an uneven surface formed by the conductor coil 4, its surface is smoothed by a precision polishing method using e.g. diamond, or by an etchback method until it has a roughness not exceeding 500 Å.

(5) A via hole portion 6 for connecting the magnetic member 10 to the thick magnetic film 7 to be formed as will hereinafter be described is formed in the insulating film 5 by e.g. ionic or chemical etching, as shown in FIG. 3(c).

(6) The thick magnetic film 7 is formed by e.g. sputtering, vacuum deposition or ion plating in a particular pattern from e.g. a Permalloy, Sendust, or other iron alloy, or an amorphous material on the surface of the insulating film 5 and the surface of the magnetic member 10 in the via hole portion 6, as shown in FIG. 3(d).

Figure 3E:
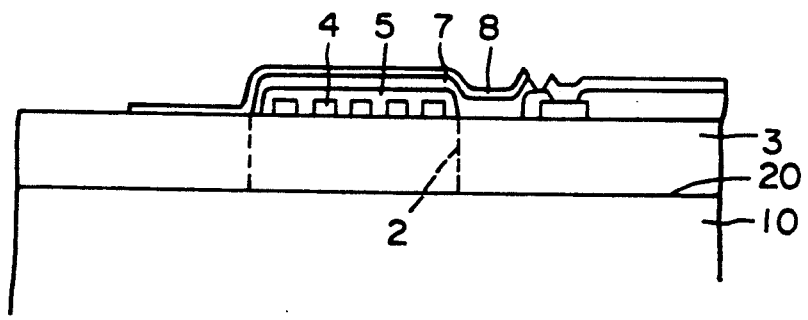

(7) A main magnetic-pole film 8 is formed by e.g. sputtering, vacuum deposition or ion plating in a particular pattern on the thick magnetic film 7, as shown in FIG. 3(e).

Figure 3F:
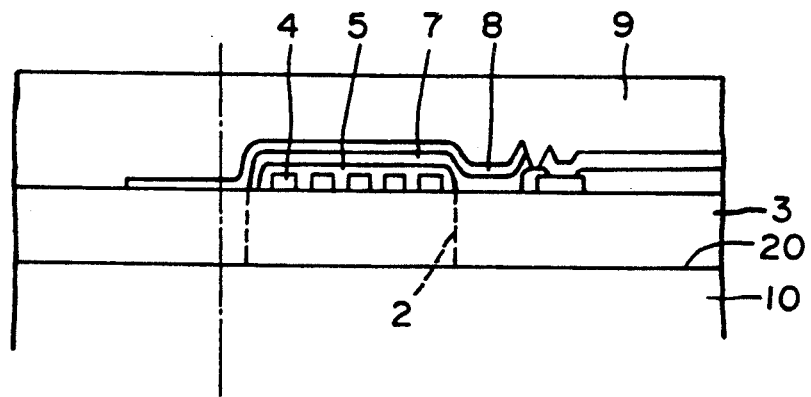

(8) A protective film 9 is formed over the film 8, as shown in FIG. 3(f).

(9) The assembly is cut to an appropriate size and shape across the main and narrow grooves 2 and 20 to give a thin-film magnetic head having a specific groove shape relative to the main magnetic pole in its sliding surface adapted to face a magnetic recording head, as shown in FIG. 1(a).

Each of the main grooves 2 in the principal surface of the magnetic substrate 1 preferably has a width which is equal to the distance between the end of the thick magnetic film 7 and the end of the via hole portion 6 when the thin-film head assembly is made, and a depth of 3 to 100 microns, and each narrow groove 20 preferably has a width which is larger by 1 to 100 microns than that of the main magnetic-pole film 8, and a depth of 3 to 100 microns which is at least equal to that of the main groove 2.

The invention will now be described more specifically with reference to an example.

EXAMPLE

A plurality of main grooves each having a width of 0.15 mm, a depth of 0.025 mm and a length of 50 mm were formed by machining in a precisely finished surface of a substrate formed from Ni-Zn ferrite. A plurality of narrow grooves each having a width of 0.075 mm, a depth of 0.025 mm and a length of 50 mm were likewise formed so as to cross the main grooves at right angles thereto.

The grooves were filled with $Al_2O_3$ in such a way that it might not form any more than one bubble larger than 5 microns per cubic millimeter. The surface of the substrate was mechanochemically polished. A copper film was formed by sputtering to form a thin-film conductor coil in a particular pattern on the polished surface of the substrate.

An interlaminar insulating film was formed from a polyimide resin to cover the coil and its surface was smoothed by an etchback method. A thick magnetic film was formed by sputtering from an amorphous cobalt alloy in a particular pattern over the insulating film. A thin main magnetic-pole film was formed by sputtering from an amorphous cobalt alloy in a particular pattern on the thick magnetic film. A protective film was formed from $Al_2O_3$ on the top of the whole assembly.

The assembly was cut to an appropriate size and shape to give a perpendicular thin-film head including a magnetic member for a return path having a specific groove configuration relative to the main magnetic-pole film in its sliding surface adapted to face a recording medium.

For the sake of comparison, a perpendicular thin-film head was likewise made from a substrate of Ni-Zn ferrite having a groove measuring 0.3 mm in width and 0.025 mm in depth, filled with glass, and defining a conventional gap layer.

The two heads having different groove configurations were tested for their reproducing output characteristics. The characteristics were determined by self recording and reproducing under the conditions as set forth below.

Medium:
CoCr/NiFe double-layered film, perpendicular coercive force $H_c = 500$ Oe, protective film/carbon.

Head:
Both had a track width, TW, of 50 microns.

Relative velocity:
7.5 m/sec.

Rotating speed:
1800 rpm.

Mechanochemical polishing:
Machine used — A 15 inch MCP machine;
Polisher — Nonwoven fabric;
Powder — MgO powder having a particle size not exceeding 0.02 micron;
Rotating speed — 20 rpm:
Pressure — 0.5 kg/mm$^2$.

Diamond polishing:
Machine used — A 15 inch single-sided lapping machine;
Polisher — An Sn plate;
Diamond — Powder having a particle size of 0.5 to 1 micron;
Rotating speed — 30 rpm;
Pressure — 0.5 kg/mm$^2$.

Determination of the waveform of reproducing output:
Disk rotating speed — 1800 rpm;
Medium — CoCr/NiFe;
Recording frequency — 0.5 to 20 MHz;
Recording current — 20 mAp-P;
Relative velocity — 7.5 m/sec.

Figure 4:
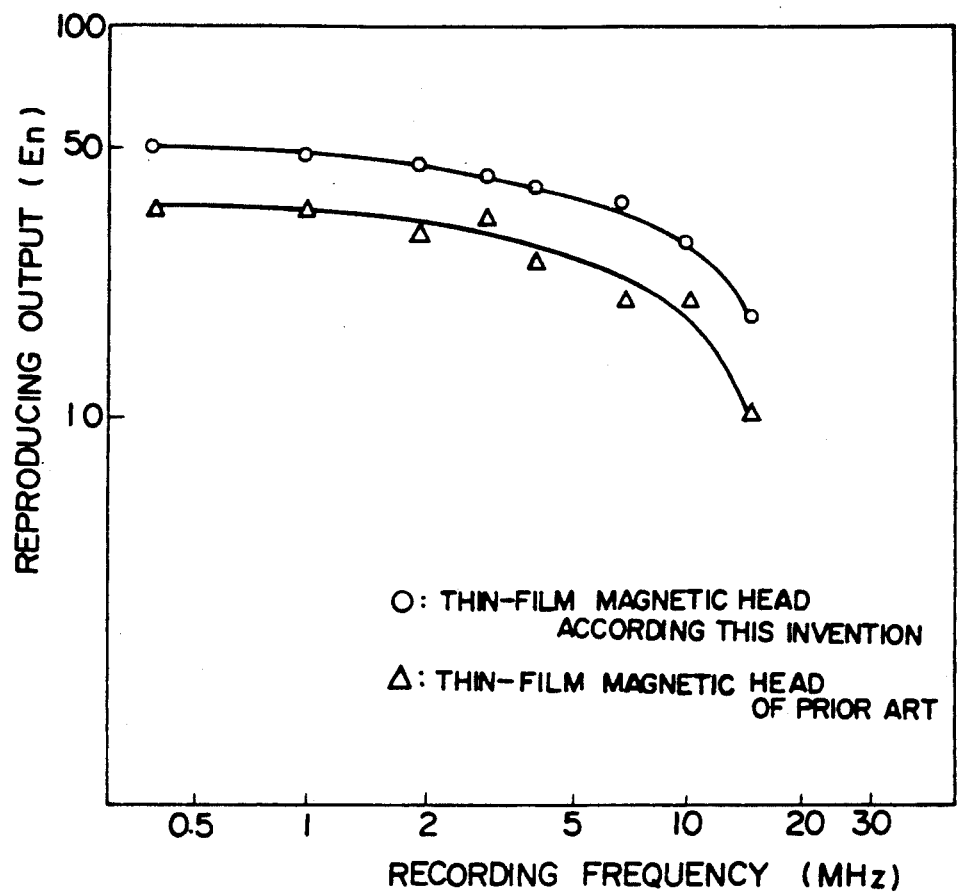
FIG. 4 is a graph comparing the reproducing outputs of the thin-film magnetic head of this invention and a known head.
Figure 5A:
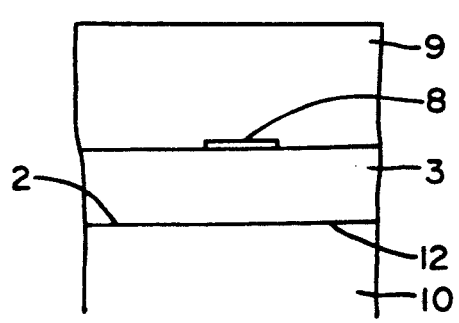
FIGS. 5(a) and 5(b) are schematic front elevational and perpendicular sectional views, respectively, of the known thin-film magnetic head.
Figure 5B:
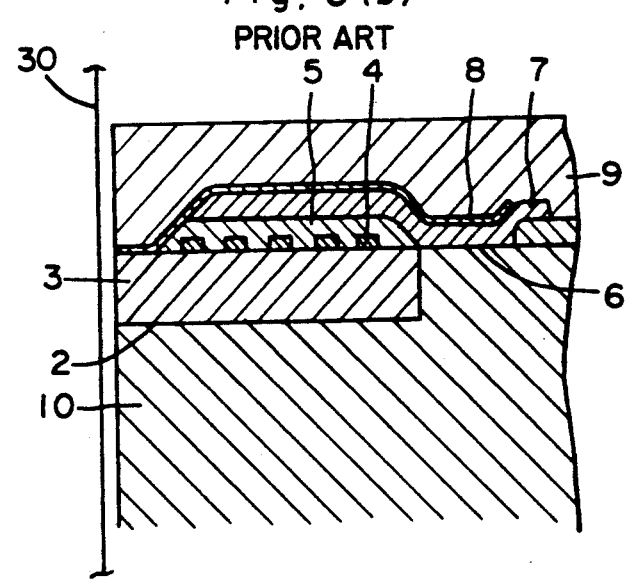

The results are shown in FIG. 4. As is obvious therefrom, the head of this invention exhibited very good reproducing output characteristics, as compared with the comparative head.

What is claimed is:

1. A thin-film perpendicular magnetic recording and reproducing head including a magnetic member for a return path having a principal surface formed with a first groove extending in parallel to a sliding surface adapted to face a magnetic recording medium, a non-magnetic material filling said groove, and at least a thin-film conductor coil, an interlaminar insulating film, a main magnetic-pole film and a protective film formed one upon another, the magnetic member being connected to the main magnetic-pole film through a via hole portion, said head having an exposed laminated surface defining said sliding surface, the improvement wherein said magnetic member has also a second groove formed in said principal surface, crossing said first groove at right angles thereto, and filled with a non-magnetic material, said coil and said films being formed immediately above the intersection of said first and second grooves, said second groove being exposed in said sliding surface, and having a width which is slightly larger than that of said main magnetic-pole film adjacent to its end exposed in said sliding surface, and a depth which is at least equal to that of said first groove, said magnetic member being exposed in said laminated surface in the vicinity of said main magnetic-pole film adjacent to said exposed end thereof.

2. A thin-film head as set forth in claim 1, wherein said exposed laminated surface is formed by said magnetic member, said non-magnetic material filling said second groove, said main magnetic-pole film and said protective film.

3. A thin-film head as set forth in claim 1, wherein said width of said second groove is larger by 1 to 100 microns than that of said main magnetic-pole film, and said depth thereof is from 3 to 100 microns.

4. A thin-film head as set forth in claim 1, wherein said magnetic member is of a material selected from the group consisting of Mn-Zn and Ni-Zn ferrites.

5. A thin-film head as set forth in claim 1, wherein said non-magnetic material is a material selected from the group consisting of glass, SiO$_2$, Al$_2$O$_3$ and barium titanate.

6. A thin-film head as set forth in claim 1, wherein said conductor coil is of a material selected from the group consisting of Au, Cu, Cr and Al.

7. A thin-film head as set forth in claim 6, wherein said conductor coil comprises a film formed by a method selected from sputtering and vacuum deposition.

8. A thin-film head as set forth in claim 1, wherein said magnetic member is of Mn-Zn ferrite, and is isolated from said conductor coil by an insulating film layer.

9. A thin-film head as set forth in claim 1, wherein said insulating film is of a material selected from the group consisting of SiO$_2$, Al$_2$O$_3$ and a polyimide resin.

10. A thin-film head as set forth in claim 1, wherein said via hole is defined through an area formed in said insulating film by a method selected from ionic and chemical etching.

11. A thin-film head as set forth in claim 1, wherein said main magnetic-pole film and a thick magnetic film on which said main magnetic-pole film lies are of a material selected from the group consisting of iron alloys known as Permalloys and Sendusts, and amorphous alloys.

12. A thin-film head as set forth in claim 1, wherein said main magnetic-pole film and a thick magnetic film on which said main magnetic-pole film lies are the products of a method selected from sputtering, vacuum deposition and ion plating.

* * * * *